United States Patent [19]

Pixton

[11] Patent Number: 4,653,212
[45] Date of Patent: Mar. 31, 1987

[54] ARTIFICAL FISHING LURE AND METHOD OF USE

[76] Inventor: Dennis N. Pixton, 604 S.W. 80 Terrace, N. Lauderdale, Fla. 33068

[21] Appl. No.: 781,333

[22] Filed: Sep. 30, 1985

[51] Int. Cl.$^4$ ............................................. A01K 85/00
[52] U.S. Cl. ......................................... 43/4.5; 43/42.1; 43/42.24; 43/42.28; 43/42.37; 43/42.39
[58] Field of Search .................. 43/42.1, 42.24, 42.28, 43/42.37, 42.39, 4.5

[56] References Cited

U.S. PATENT DOCUMENTS

| | | | |
|---|---|---|---|
| 2,927,392 | 3/1960 | Lievense | 43/42.37 |
| 2,955,378 | 10/1960 | Burke | 43/42.37 |
| 3,120,074 | 2/1964 | Messler | 43/42.39 |
| 3,465,466 | 9/1969 | Showalter | 43/44.81 |
| 3,965,606 | 6/1976 | Bingler | 43/42.37 |
| 4,123,870 | 11/1978 | Wiskirchen | 43/42.37 |
| 4,167,076 | 9/1979 | Weaver | 43/42.24 |
| 4,219,956 | 9/1980 | Hedmun | 43/42.39 |
| 4,244,133 | 1/1981 | Martinek | 43/42.28 |
| 4,334,381 | 6/1982 | Carver | 43/44.81 |
| 4,367,607 | 1/1983 | Hedmun | 43/42.24 |

OTHER PUBLICATIONS

C. Boyd Pfeiffer, When the Worm Turns, Bass Master, May–Jun. 1982, pp. 62–68.
Bill Palmroth, Flippin' for Bass, Bass Master, Mar., 1984, pp. 14–15.

Primary Examiner—Nicholas P. Godici
Assistant Examiner—Christopher L. McKee
Attorney, Agent, or Firm—Richard M. Saccocio

[57] ABSTRACT

An artificial fishing lure to be attached at the end of a fishing line so that a streamlined lure is provided that penetrates a body of water with a minimum of disturbance. The weight is mounted at the head end of a flexible worm member thereby providing maximum pendulum arm and being disconnected completely from the hook member and the line. The worm then rests on its head end providing a lure that resembles more a life worm and has the desired characteristics of a projectile that facilitates accurate casting.

8 Claims, 13 Drawing Figures

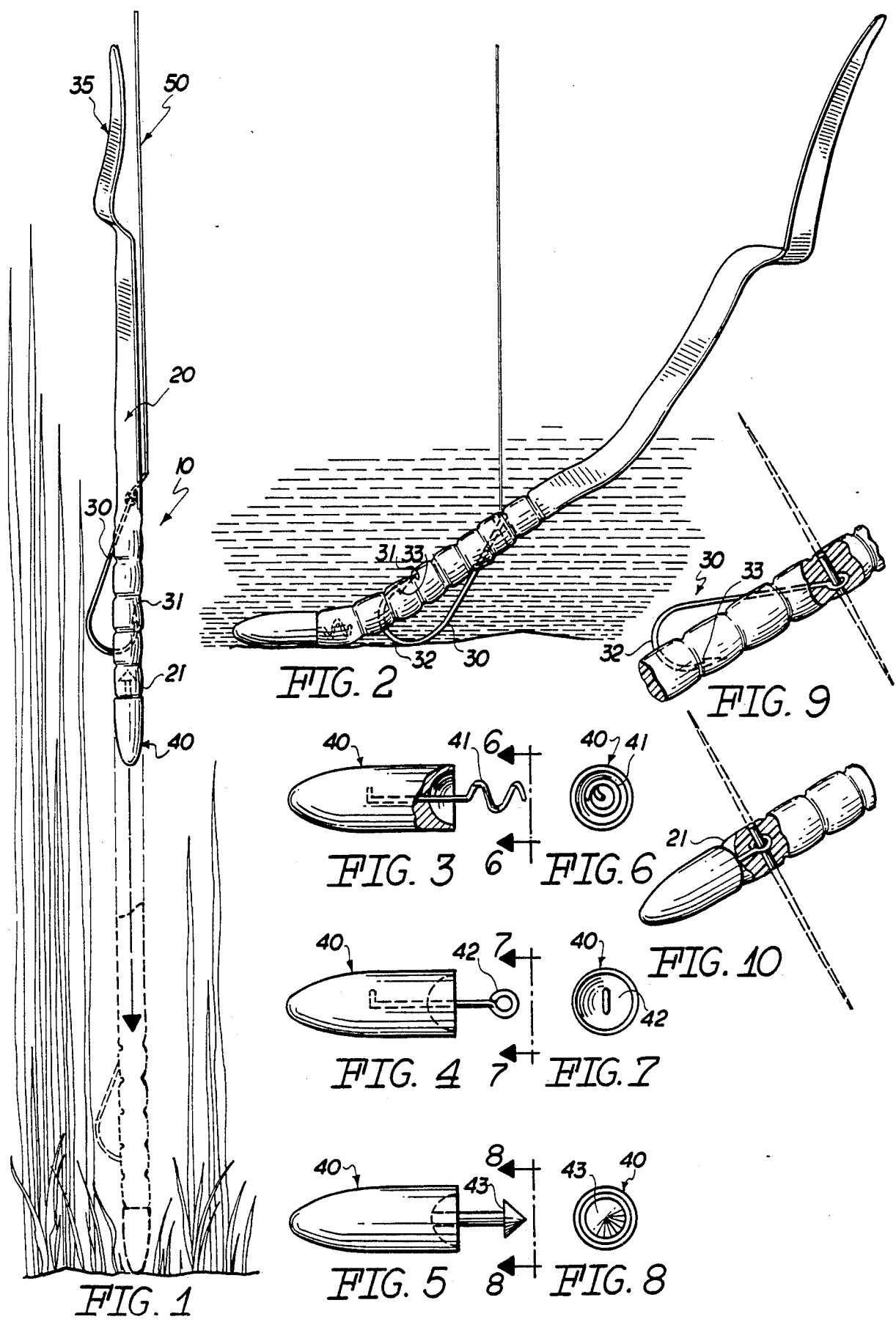

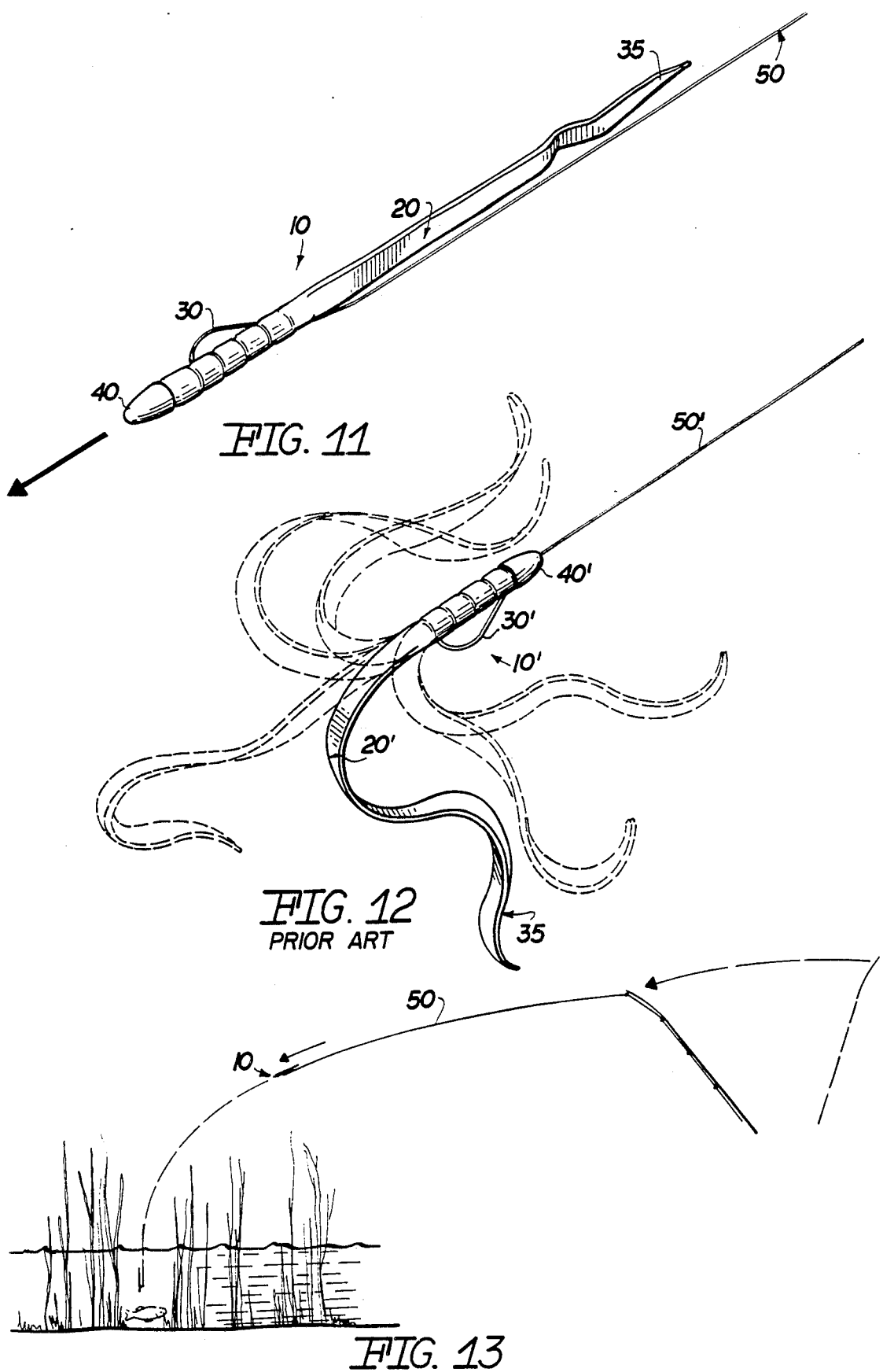

ARTIFICAL FISHING LURE AND METHOD OF USE

BACKGROUND OF THE INVENTION

1. Field of the Invention

The present invention relates to fishing lures, and more specifically it relates to fishing lures used in bass fishing.

2. Description of the Prior Art

In bass fishing, there are several methods of casting a lure. Casting accuracy and a minimum of noise and disturbance upon a lure's entry into the water are major factors in the fisherman's ability to catch fish. The most conventional method is the overhead cast generally used for long distance casting. Another method is the underhand or flipcast, used for short distances when accuracy is much more important. This flip cast method is known by different names in different areas (flipping, jigging, doodle-socking). All casting methods use the pendulum motion of the lure and the overhead method adds fishing rod flexing to aid casting distances. The ability of the user is definitely a factor but the streamlined physical configuration of the lure may enhance this ability and facilitate his or her undertakings.

Of all the lures used in bass fishing, the artificial (or soft plastic) worm is the most popular. There are several ways of rigging this worm, one of them being called the "Texas Rig". A good description of these rigs may be found in the March, 1984 issue of The Bass Master magazine. The Texas Rig includes a slip sinker where the line is passed freely through a hole in the sinker then attached to a hook that is threaded through the head of the worm. The sinker is allowed to slip up and down the line freely until stopped by the head of the worm or restrained from slipping by inserting a peg or toothpick into the hole of the sinker wedging the line. Another way of rigging a worm is to use a weighted hook commonly called a "Jig". The line is attached to the hook and the soft plastic worm is then threaded onto the hook. These ways fail to provide a rig that smoothly comes in contact with the water while at the same time providing the maximum pendulum arm for the farthest and accurate cast or flip cast. With the Texas Rig and the Jig with worm, the worm dangles outside of the maximum pendulum arm caused by the sinker. This dangling is completely uncontrolled during the cast and causes loss of accuracy, noisy lure water entry and loss of distance especially during windy weather and/or in areas of dense above water level weed growth.

The present invention provides a rig that is more aerodynamic and volumetrically efficient than the others because the sinker is at the very end of the pendulum arm.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a lure that allows the maximum pendulum arm during a casting and comes in contact with the water with minimum disturbance.

It is another object of the present invention to provide a lure wherein the weight is not attached to the line or the hook, but rather to the head of the worm causing it to orientate itself downwardly.

It is also another object of this invention to provide a streamlined lure for better casting distance and accuracy.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents the lure of the present invention sinking straight down and the phantom representation shows its weedless characteristics.

FIG. 2 shows the invention as it rests on the bottom.

FIG. 3 illustrates a weight element with one of the preferred mounting means.

FIG. 4 shows another preferred embodiment of mounting means.

FIG. 5 represents still another preferred mounting means.

FIG. 6 is a view, along line 6—6, of FIG. 3.

FIG. 7 is a view, along line 7—7, of FIG. 4.

FIG. 8 is a view, along line 8—8, of FIG. 5.

FIG. 9 is a detailed view of the manner in which the hook is pegged in place with a toothpick.

FIG. 10 shows how the mounting means (eye type) of FIG. 4 is pegged in place.

FIG. 11 represents the present invention as it travels through the air.

FIG. 12 shows a Texas rig travelling through the air.

FIG. 13 illustrates how the present invention is used by a fisherman to accurately land on a target area.

DETAILED DESCRIPTION OF THE PREFERRED EMBODIMENT

Referring now to FIG. 1, where the present invention is generally referred to with numeral 10, it can be observed that the present artificial lure basically consists of a flexible worm member 20, a hook element 30, a weight member 40 and line 50.

Worm member 20 may have an infinite number of shapes, but in the preferred embodiment it includes a front end or head portion 21 and a tail portion 35 that is substantially flat.

Weight member 40 has the shape of a bullet in order to have a design that is streamlined for easy and smooth penetration in a waterbody with minimum disturbance. A mounting assembly is provided with weight members 40. Three mounting assemblies are shown: corkscrew 41, eye type 42 and arrowhead 43. See FIGS. 3; 4 and 5. Corkscrew mounting assemblies 41; 42 and 43 may be integrally built inside weight member 40 with sufficient rear protrusion to effectively attach or mount on to the front end 21 of worm member 20, as shown in FIGS. 1; 2 and 10. Corkscrew mounting assembly 41 is mounted on front end 21 by gently rotating it while inserting the tip of the corkscrew through the flexible plastic worm 20. With the corkscrew type mounting assembly, weight sizes can be changed easily with a minimum of damage to the worm's body. The eye type mounting assembly 42 is pushed inside front end 21 and a toothpick is inserted through the eye termination, as shown in FIG. 10. The toothpick is then clipped so that it terminates flush with the outer surface of worm 20. Arrowhead mounting assembly 43 is pushed in like assembly 42 but it does not need anything else to hold it in place. Refer to FIG. 1.

Hook 30 is inserted approximately one-quarter of the worm's length away from front end 21 and bend 32 extending toward front end 21, as shown in FIG. 2. Point 31 and barb 33 of fishhook 30 is hidden inside the body of worm 20. Hook member 30, in the preferred embodiment, includes a J-shape shank that has a barbed portion on one end and an eye termination on the other end.

As it can be seen from FIG. 1, tail portion 35 of worm 20 is, in the preferred embodiment, flat and carries considerable less weight than the rest of worm 20, and much less than the worm 20 and weight member 40 combination. Tail portion 35, then, does not materially affect the desired pendulum motion characteristic of the fisherman's casting or flipping of the lure.

The disposition of the weight at the head of worm 20 causes it to stand upside down generally, as shown in FIGS. 1 and 2, resembling more closely a real life worm. As seen in FIG. 2, when the inventive lure 10 is on the bottom surface of the water and when the line 50 attached to hook member 30 is held taut so as to slightly raise the eye end of hook 30, the tail portion 35 and the intermediate body portion of flexible member 20 are raised while the weighted head portion 21 rests on the bottom surface. This, as can be appreciated, allows tail portion 35 to be suspended within the water and to move slowly due to the slightest amount of water movement in a true-to-life, wave-like manner which is most attractive to fish. The slight lowering of the line 50 attached to hook 30 from the position shown in FIG. 1 to that shown in FIG. 2 further accentuates the true-to-life, wave-like motion. By contrast, the prior art lures, with the eye of the hook at the head end, when moved downward after reaching the bottom of the water, merely causes the lure to fall downward and does not impart true-to-life motion to the lure.

Furthermore, this combination makes the lure relatively weedless, that is, it is less likely to become entangled with weeds, plants and other bodies usually found on and inside bodies of water.

By separating weight member 40 from hook member 30 and worm member 20, the probability of tail portion 35 getting caught somewhere, especially around the periphery of a target where weight member 40 was intended to have dropped, is minimum.

For instance, a target may be a hole or area without weeds and surrounded by weeds and the fisherman may desire to accurately drop his lure into this hole or area. If the lure is not aerodynamically designed, the chances are that it may get caught or tangled before reaching the hole or the area in question. See FIG. 13. The present invention travels through the air smoothly as shown in FIG. 11, whereas the conventional Texas rig 10' in FIG. 12 does not terminate with the weight 40' and the worm 20' flaps all over.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. An artificial lure comprising a flexible member having a substantially cylindrical elongated head portion and a substantially flat elongated tail portion, a J-shaped hook member having an eye opening at one end and a barbed point at the other end, the barbed end of said hook member transpiercing said flexible member at the head end of the cylindrical portion and the eye end of said hook member transpiercing the flexible member at the tail end of said cylindrical portion whereby the portion of said hook member between said barbed end and said eye end extends in a curved manner from the head end of the flexible member toward the tail end thereof; and, means attached to the head end of said flexible member including mounting means for weighting the end of the head of said flexible member.

2. The fishing lure set forth in claim 1 wherein said eye end of the hook member transpierces said flexible member at a point approximately one-fourth the length of said flexible member away from said head end portion.

3. The fishing lure set forth in claim 1 wherein said mounting means includes a corkscrew mounting assembly.

4. The fishing lure set forth in claim 1 wherein said mounting means includes an eye type mounting assembly.

5. The fishing lure set forth in claim 1 wherein said mounting means includes an arrowhead mounting assembly.

6. A method for attaching a hook member having a "J" shape with a barb point at one end and an eye opening at the other end, to a flexible elongated worm-like member having a substantially cylindrical head portion and a substantially flat tail portion comprising the steps of:
    inserting the barbed end of said hook member through a portion of the cylindrical portion thereof near the tail end thereof,
    pulling the hook member until the eye end thereof is transversely fixed within said tail end of the cylindrical portion, and
    inserting the barbed end of said hook member into the head end of said cylindrical portion whereby the curved portion of said hook member extends in a curved streamlined manner from the head end of said cylindrical portion to the tail end thereof.

7. The method of claim 6 including the step of attaching a weighted member to the free end of the cylindrical head portion of said flexible member with said weighted member having a bullet-like shape and whereby the head end of said cylindrical portion is provided with a streamlined shape which thereby allows the lure to enter water with the weighted head end down so as to penetrate through any vegetable matter in the water and located at the point of entrance of the lure.

8. A method of resting an artificial fishing lure comprising a flexible elongated worm-like lure having a J-shaped hook member attached therethrough with a barbed end of said hook member being located at the head end of said artificial lure and the eye end of said hook member being located toward the tail end of said artificial lure, said artificial lure having a weight attached to the head end thereof, comprising the step of resting the weighted head end of said artificial fishing lure on the bottom surface of the water with the tail end of said artificial fishing lure being suspended within the water due to the eye end of the hook member having a line attached thereto being held taut and above the bottom surface of the water.

* * * * *